(12) United States Patent
Gerber et al.

(10) Patent No.: US 10,700,975 B2
(45) Date of Patent: *Jun. 30, 2020

(54) SYSTEMS AND METHODS FOR OPTIMIZED ROUTE CACHING

(71) Applicant: AT&T INTELLECTUAL PROPERTY I, L.P., Atlanta, GA (US)

(72) Inventors: Alexandre Gerber, Madison, NJ (US); Changhoon Kim, Palo Alto, CA (US); Jennifer L. Rexford, Princeton, NJ (US); Matthew Caesar, Buffalo Grove, IL (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/412,326

(22) Filed: Jan. 23, 2017

(65) Prior Publication Data

US 2017/0134279 A1    May 11, 2017

Related U.S. Application Data

(63) Continuation of application No. 15/165,235, filed on May 26, 2016, now Pat. No. 9,559,955, which is a
(Continued)

(51) Int. Cl.
*H04L 12/745* (2013.01)
*H04L 12/715* (2013.01)
(Continued)

(52) U.S. Cl.
CPC ............ *H04L 45/748* (2013.01); *H04L 45/00* (2013.01); *H04L 45/04* (2013.01); *H04L 45/742* (2013.01);
(Continued)

(58) Field of Classification Search
CPC ....... H04L 45/54; H04L 45/00; H04L 45/742; H04L 45/748; H04L 45/04; H04L 45/7457
(Continued)

(56) References Cited

U.S. PATENT DOCUMENTS 5,590,116 A     12/1996  Zhang
6,094,706 A *   7/2000   Factor ................. G06F 12/0875
                                            707/999.006
(Continued)

OTHER PUBLICATIONS

Kim et al., "Evaluating Route Caching in an ISP Backbone," AT&T Labs, Inc., 2008.
(Continued)

*Primary Examiner* — Hoang-Chuong Q Vu
(74) *Attorney, Agent, or Firm* — Akerman LLP; Michael K. Dixon; Mammen (Roy) P. Zachariah, Jr.

(57) ABSTRACT

A method for optimized route caching includes comparing a destination address of a network packet to a first set of prefixes in a routing cache, and comparing the destination address to a second set of prefixes in a full routing table when a longest matching prefix for the destination address is not found in the routing cache. The method further includes copying the longest matching prefix and a set of sub-prefixes of the longest matching prefix from the full routing table to the routing cache, and forwarding the network packet.

12 Claims, 5 Drawing Sheets

Related U.S. Application Data continuation of application No. 14/930,112, filed on Nov. 2, 2015, now Pat. No. 9,413,663, which is a continuation of application No. 14/563,102, filed on Dec. 8, 2014, now Pat. No. 9,210,084, which is a continuation of application No. 12/207,166, filed on Sep. 9, 2008, now Pat. No. 8,908,696.

(51) Int. Cl.
| | |
|---|---|
| *H04L 29/12* | (2006.01) |
| *H04L 12/743* | (2013.01) |
| *H04L 12/701* | (2013.01) |
| *H04L 12/747* | (2013.01) |

(52) U.S. Cl.
CPC ...... *H04L 45/7457* (2013.01); *H04L 61/2007* (2013.01); *H04L 61/6009* (2013.01)

(58) Field of Classification Search
USPC .............. 370/389, 401, 395.31, 395.32, 392; 709/238, 242; 711/216, 221, 118
See application file for complete search history.

(56) References Cited

U.S. PATENT DOCUMENTS

| | | | |
|---|---|---|---|
| 6,141,738 | A | 10/2000 | Munter et al. |
| 6,243,720 | B1 | 6/2001 | Munter et al. |
| 6,434,144 | B1* | 8/2002 | Romanov ............... H04L 45/00 370/392 |
| 6,590,898 | B1 | 7/2003 | Uzun |
| 6,651,052 | B1* | 11/2003 | Westphal ................ G06F 16/20 |
| 6,768,739 | B1 | 7/2004 | Kobayashi et al. |
| 6,792,423 | B1 | 9/2004 | Jeffries et al. |
| 6,928,485 | B1 | 8/2005 | Krishnamurthy et al. |
| 6,993,031 | B2* | 1/2006 | Murase ................... H04L 45/00 370/395.32 |
| 7,020,698 | B2 | 3/2006 | Andrews et al. |
| 7,027,445 | B1* | 4/2006 | Sunada ................... H04L 45/00 370/395.31 |
| 7,120,152 | B2 | 10/2006 | Park |
| 7,191,168 | B1 | 3/2007 | Buchsbaum et al. |
| 7,219,160 | B1 | 5/2007 | Buchsbaum et al. |
| 7,296,089 | B2 | 11/2007 | Krishnamurthy et al. |
| 7,483,430 | B1* | 1/2009 | Yuan ....................... H04L 45/00 370/255 |
| 7,664,806 | B1* | 2/2010 | Koudas ............... G06F 16/2471 707/899 |
| 8,089,895 | B1* | 1/2012 | Mackie ................. H04L 43/026 370/252 |
| 2001/0028651 | A1 | 10/2001 | Murase |
| 2003/0023581 | A1* | 1/2003 | Davis ...................... H04L 45/04 |
| 2003/0219017 | A1* | 11/2003 | Davis ...................... H04L 45/00 370/392 |
| 2004/0015494 | A1* | 1/2004 | Basso ..................... H04L 45/00 |
| 2005/0018683 | A1* | 1/2005 | Zhao ................... H04L 45/7457 370/393 |
| 2005/0220123 | A1 | 10/2005 | Wybenga et al. |
| 2005/0232264 | A1 | 10/2005 | Wybenga et al. |
| 2006/0159086 | A1 | 7/2006 | Bras et al. |
| 2006/0239199 | A1* | 10/2006 | Blair ....................... H04L 45/04 370/248 |
| 2007/0047462 | A1 | 3/2007 | Collins et al. |
| 2007/0073975 | A1* | 3/2007 | Lee ......................... G06F 12/12 711/133 |
| 2007/0223480 | A1* | 9/2007 | Levy ....................... H04L 45/04 370/392 |
| 2008/0186970 | A1 | 8/2008 | Wisener et al. |
| 2008/0259933 | A1* | 10/2008 | Okada ..................... H04L 45/00 370/395.31 |
| 2009/0238111 | A1 | 9/2009 | Hirano et al. |
| 2010/0272107 | A1* | 10/2010 | Papp ................. H04L 29/12028 370/392 |

OTHER PUBLICATIONS

Caesar et al., "ROFL: Routing on Flat Labels," SIGCOMM '06 Proceedings of the 2006 conference on Applications, technologies, architectures, and protocols for computer communications, pp. 363-374, Pisa, Italy, Sep. 2006.

Stoica et al., "Internet indirection infrastructure," SIGCOMM Comput. Commun. Rev. 32, 4, pp. 73-86, Aug. 2002.

Kim et al., "Floodless in SEATTLE: A Scalable Ethernet Architecture for Large Enterprises," in Proc. SIGCOMM, Aug. 2008.

"How to Choose the Best Router Switching Path for Your Network," Cisco Systems, Aug. 10, 2005, http://www.cisco.com/warp/public/105/20.pdf.

* cited by examiner

SYSTEMS AND METHODS FOR OPTIMIZED ROUTE CACHING

CROSS REFERENCE TO RELATED APPLICATIONS

This application claims priority to and is a continuation of U.S. patent application Ser. No. 15/165,235, filed May 26, 2016, which is a continuation of U.S. patent application Ser. No. 14/930,112, filed Nov. 2, 2015, now U.S. Pat. No. 9,413,663 which is a continuation of U.S. patent application Ser. No. 14/563,102, filed Dec. 8, 2014, now U.S. Pat. No. 9,210,084, which is a continuation of U.S. patent application Ser. No. 12/207,166, filed Sep. 9, 2008, now U.S. Pat. No. 8,908,696, all of which are hereby incorporated by reference in their entireties.

FIELD OF THE DISCLOSURE

The present disclosure generally relates to communications networks, and more particularly relates to systems and methods for optimized route caching.

BACKGROUND

For Internet traffic to reach its destination, routers along the way need to make informed decisions about the path the traffic should follow. This requires the routers to maintain routing information for numerous Internet Protocol (IP) addresses. Additionally, through the allocation of additional IP addresses, the global routing table is growing, increasing the memory required to store the routing table. In order to maintain a high rate of traffic through a given router, access to the routing information and decisions about the next stop along the path need to occur rapidly, requiring relatively expensive high-speed memory for storing the routing table.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others.

Figure 1:
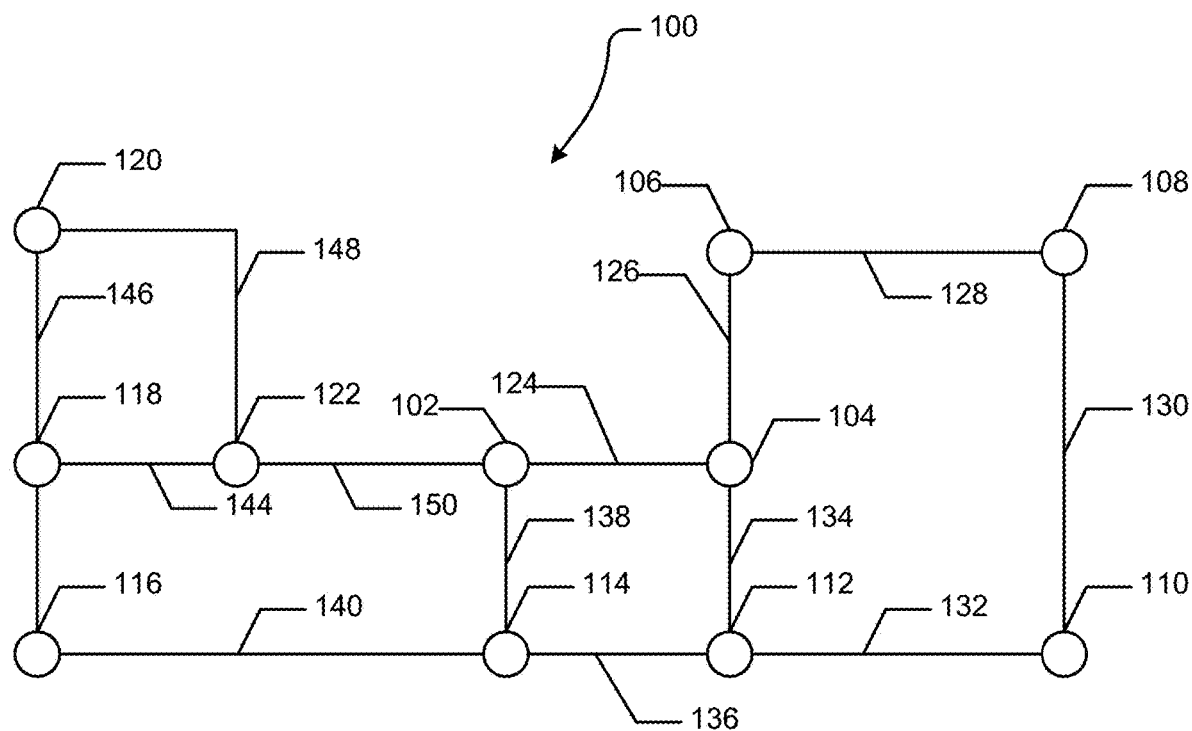
FIG. 1 is a diagram illustrating an embodiment of a communications network.

FIG. 1 shows an illustrative communications network, generally designated 100. Communications network 100 can be an autonomous system or a high capacity core network. Communications network 100 can include a plurality of network nodes 102 through 122. For example, network node 102 can be an Internet core router. Pairs of network nodes 102 through 122 can be connected by network links 124 through 150. For example, network node 102 can be connected to network node 104 though network link 124. Network links 124 through 150 can be fiber optic, coaxial cable, copper twisted-pair, or wireless connections.

Each network link has a network capacity that limits the amount of traffic that can travel through the network link. In an exemplary embodiment, the network links 124 through 150 can be high capacity links, such as 10 Gb/s fiber optic connections. Alternatively, the link capacity can be higher or lower than 10 Gb/s. When the amount of traffic exceeds the link capacity, the network link can become congested. During limited periods of congestion, traffic can be queued at the network node. However, the queuing capacity can be limited, resulting in network packets being dropped during extended periods of congestion.

In order for network packets to reach their destination, traffic nodes 102 through 122 can determine the next hop for each network packet. The next hop can be determined based on the destination address of the network packet and a forwarding information base (FIB). The FIB can include classless inter-domain routing (CIDR) prefixes for each subnet in the network, as well as preferred next hop information corresponding to each CIDR prefix. When determining the next hop for a network packet, the destination address can be compared to the prefixes in the FIB to find a subnet to which the destination belongs. The network packet can be directed to the preferred next hop for that subnet. When the destination address matches multiple prefixes in the FIB, the longest matching prefix (LMP) is used. For example, when the FIB includes the prefixes 12.5/16 and 12.5.1/24, 12.5.1/24 can be the LMP for the destination address 12.5.1.10 and 12.5/16 can be the LMP for the destination address 12.5.2.52.

Figure 2:
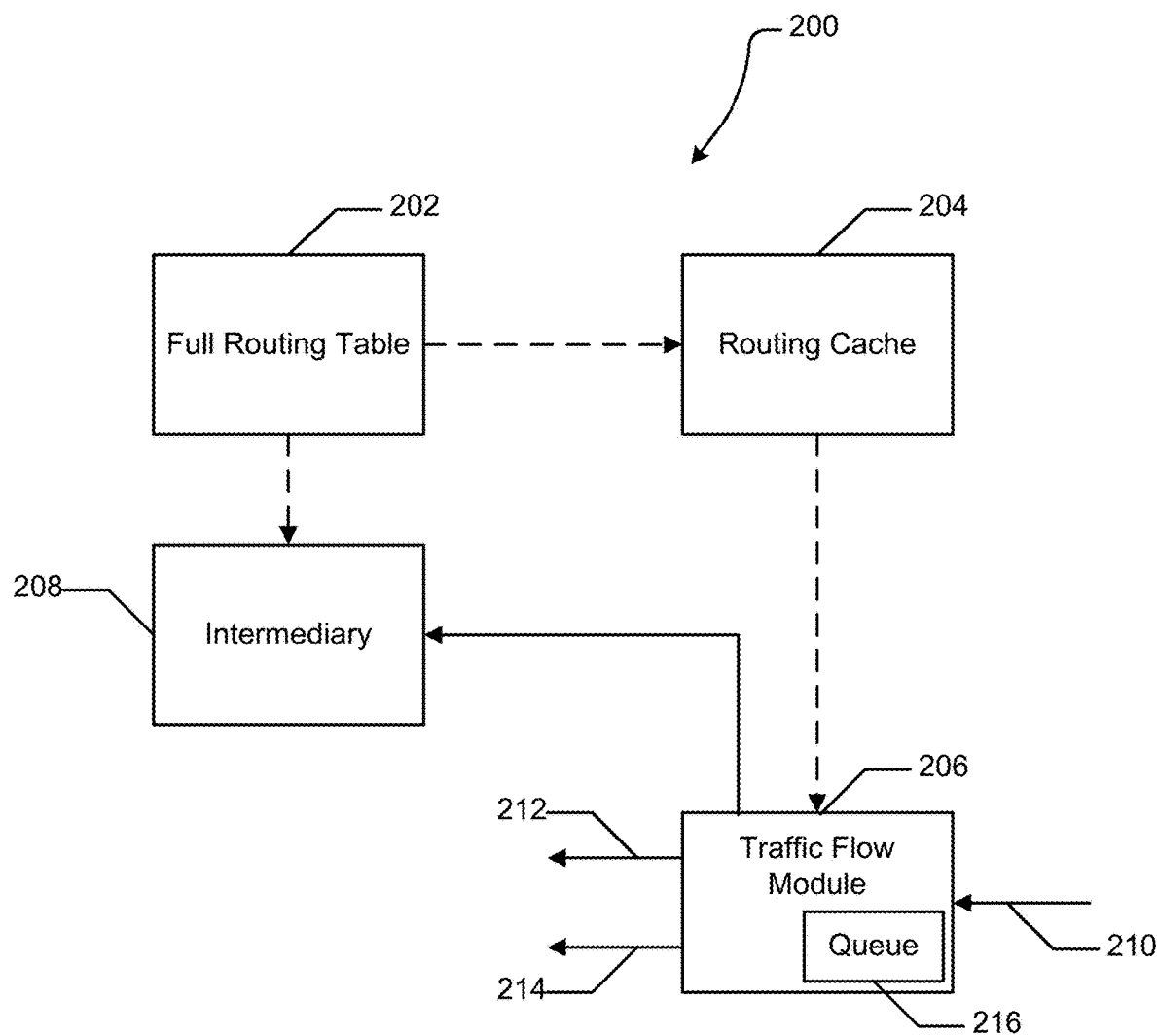
FIG. 2 is a block diagram illustrating an exemplary system for routing traffic through a communications network.

FIG. 2 shows a block diagram illustrating a system 200 for routing IP traffic. The system can include a full routing table 202, a routing cache 204, a traffic flow module 206, and an intermediary module 208. Each of the full routing table 202, the routing cache 204, the traffic flow module 206, and the intermediary module 208 can be implemented in hardware, software, or any combination thereof.

The full routing table 202 can include a FIB. The FIB includes a plurality of CIDR prefixes and a preferred route for each CIDR prefix. The routing cache 204 can include a subset of the CIDR prefixes in the FIB and the associated preferred routes. The subset of CIDR prefixes can include prefixes that have recently been used to forward traffic. When a network packet having a destination address is received, an LMP and the corresponding preferred route can be copied from the full routing table 202 to the routing cache 204. When the routing cache 204 is full, prefixes may be evicted from the routing cache 204. The prefixes may be evicted according to a least recently used (LRU) algorithm, a least frequently used (LFU) algorithm, or other type of cache algorithm. The LRU algorithm can track the last time a prefix in the cache was used to route a packet, and can evict the prefix with a last used time furthest in the past. The LFU algorithm can track the number of times a prefix in the cache is used to route a packet, and can evict the prefix that has been used the smallest number of times. Additionally, when there are multiple prefixes matching the eviction criteria, the routing cache 204 can evict the least specific or shortest prefix. In an embodiment, if a longer, more specific sub-prefix was evicted from the cache prior to evicting the shorter, less specific prefix, a network packet to the sub-prefix may be incorrectly routed based on the preferred route associated with prefix.

The traffic flow module 206 can direct incoming traffic 210 to one of a plurality of out interfaces 212 and 214 based on the preferred route associated with the LMP of the destination address. The traffic flow module 206 can include a queue 216 for temporarily holding network packets. The queue 216 can be a first in, first out queue. Network packets may be placed in queue 216 when there is a delay in forwarding the network packet to the next hop, such as when the appropriate out interface 212 or 214 is congested, or when an LMP is not currently in the routing cache 204 requiring a look-up in the full routing table 202. When the queue is full, adding an additional network packet to the queue can cause a packet to be dropped. In another embodiment, the packet may be dropped when the LMP is not in the routing cache 204.

In yet another embodiment, when the LMP is not in the routing cache 204, the traffic flow module 206 can forward the network packet to the intermediary module 208. The intermediary module 208 can have relatively fast access to the full routing table 202. When the intermediary module 208 receives a network packet from traffic flow module 206, the intermediary module 208 can route the network packet based on the preferred route associated with the LMP in the full routing table 202.

Figure 3:
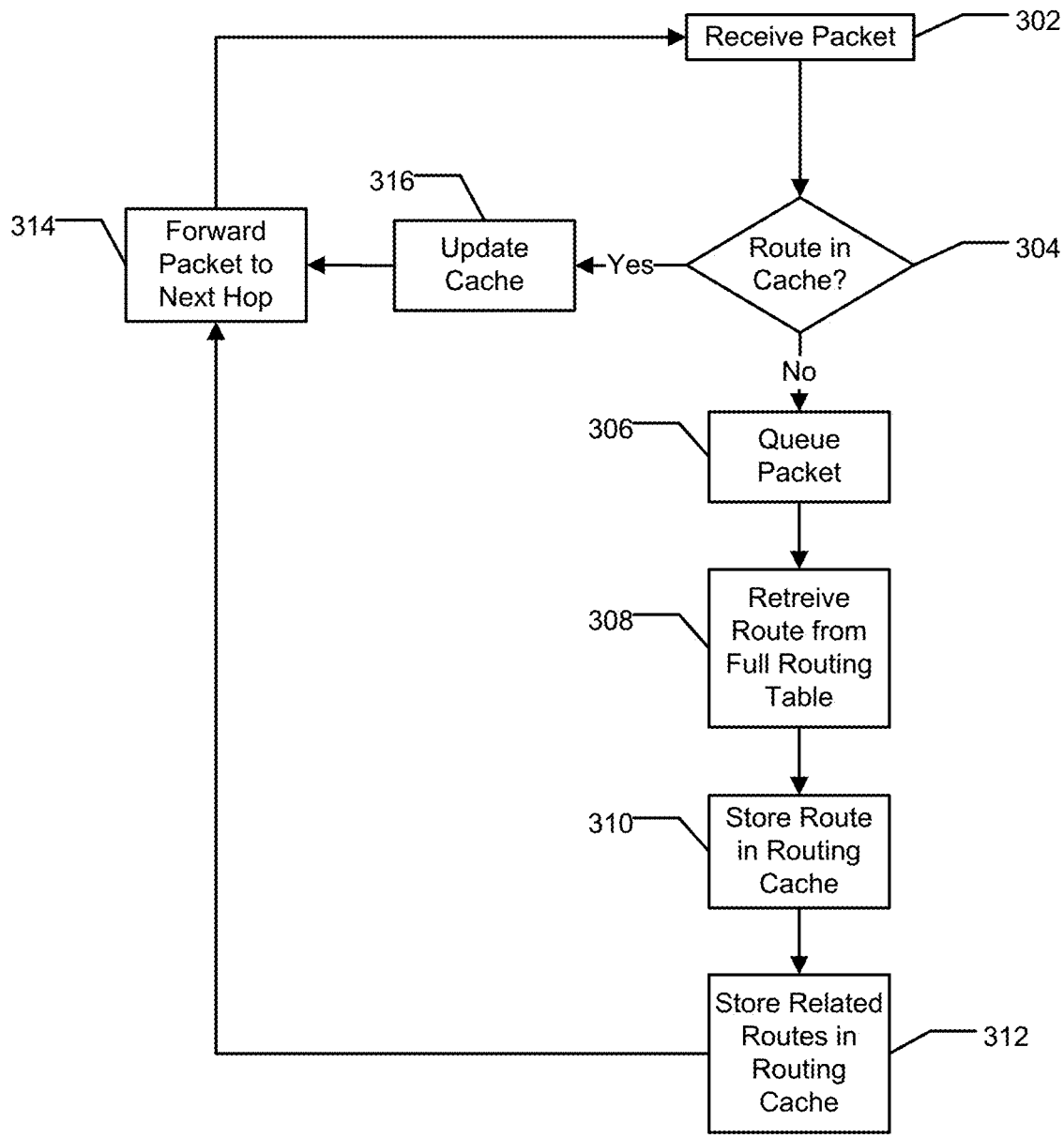
FIG. 3 is a flow diagram illustrating an exemplary method for routing traffic.

FIG. 3 is a flow diagram illustrating an exemplary method for routing traffic utilizing a routing cache. At 302, a network packet can be received. The network packet can include a destination address. At 304, the destination address can be compared to the prefixes stored in the routing cache.

When a prefix matching the destination address is not found in the routing cache, the network packet can be placed in the queue, as illustrated at 306. At 308, the destination address can be compared to the prefixes in the full routing table to find an LMP corresponding to the destination address, and, at 310, the LMP can be copied from the full routing table to the routing cache. At 312, a set of additional prefixes can be copied from the full routing table to the routing cache. The set of additional prefixes can include sub-prefixes of the LMP. For example, if the full routing table includes the prefix 12.5/16 and 12.5.1/24, then 12.5.1/24 can be a sub-prefix of 12.5/16 and can be copied to the routing cache along with 12.5/16. At 314, the network packet can be removed from the queue and forwarded to the next hop based on the preferred routing information associated with the LMP. At 302, another network packet can be received.

In an exemplary embodiment, the set of additional prefixes can include every sub-prefix of the LMP. In another embodiment, the set of additional prefixes can include only those sub-prefixes associated with an output port different from the output port associated with the LMP. For example, the full routing table can include the prefix 12.5/16 and the sub-prefixes 12.5.1/24 and 12.5.2/24. 12.5/16 and 12.5.2/24 can be associated with output port 1, and 12.5.1/24 can be associated with output port 2. When the prefix 12.5/16 is the LMP, only the preferred route for 12.5/16 and 12.5.1/24 can be copied to the routing cache.

In a further embodiment, the set of additional prefixes can include one or more special-purpose prefixes that are sub-prefixes of the LMP, and that can instruct the traffic flow module to check the full routing table for the preferred router. In this way, the special-purpose prefix can represent all multiple sub-prefixes, even if the sub-prefixes are associated with different output ports, thereby reducing the number of sub-prefixes copied to the routing cache. For example, the full routing table can include the LMP 12/8 and the sub-prefixes 12.5/16, 12.5.1/24, and 12.5.2/24. A special-purpose prefix 12.5/16 instructing a look-up on the full routing table can be placed in the routing cache along with the LMP 12/8. When a second packet having a destination address of 12.5.2.156 arrives, the traffic flow module can check the routing cache. The LMP in the routing cache for the second packet can be the special-purpose prefix 12.5/16, and the traffic flow module can check the full routing table for the preferred route. The preferred route for the sub-prefix 12.5.2/24 can be copied into the routing cache. Subsequent packets destined for the 12.5.2/24 sub-prefix can match the 12.5.2/24 sub-prefix in the routing cache and may not require looking in the full routing table.

In yet another embodiment, multiple contiguous prefixes in the cache that are associated with the same output port can be merged into a single super-prefix. For example, the full routing table can include the LMP 12.5/16 associated with output port 1 and the sub-prefixes 12.5.2/24 and 12.5.3/24 associated with an output port 2. The sub-prefixes 12.5.2/24 and 12.5.3/24 may have the same next hop or output port but different down-stream routes, causing them to be separate in the full routing table. When the LMP 12.5/16 is copied to the routing cache, the sub-prefixes 12.5.2/24 and 12.5.3/24 can be combined into a super-prefix 12.5.2/23 associated with output port 2 and the super-prefix can be copied into the routing cache.

Alternatively, when a prefix matching the destination address is found in the routing cache, the cache can be updated at 316. Updating the cache can include incrementing the number of times the prefix has been used, or changing the last used time for the prefix. In an embodiment, all sub-prefixes of the LMP can also be updated. In this way, a longer, more specific sub-prefix cannot be eligible for eviction prior to a shorter, less specific prefix. In an embodiment, if the sub-prefix were evicted from the cache prior to evicting the prefix, a network packet to the sub-prefix may be incorrectly routed based on the preferred route associated with prefix. At 314, the network packet can be forwarded based on the next hop information in the routing cache, and another network packet can be received, as illustrated at 302.

Figure 4:
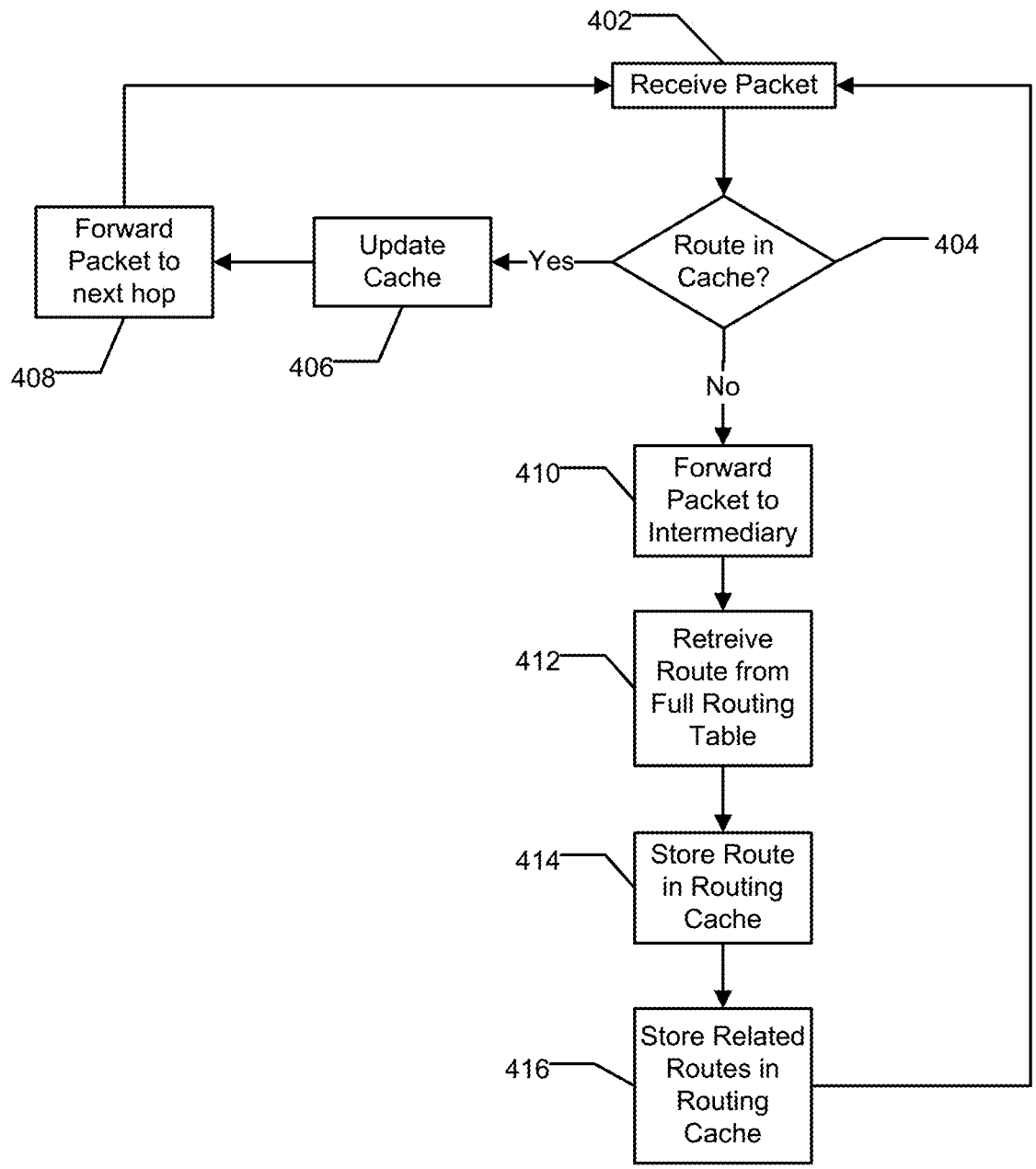
FIG. 4 is a flow diagram illustrating another exemplary method for routing traffic.

FIG. 4 is a flow diagram illustrating an exemplary method for routing traffic utilizing a routing cache. At 402, the traffic flow module can receive a network packet. The network packet can include a destination address. At 404, the destination address can be compared to the prefixes stored in the routing cache. When an LMP matching the destination address is found in the routing cache, the cache can be updated at 406. Updating the cache can include incrementing the number of times the prefix has been used, or changing the last used time for the prefix. In an embodiment, all sub-prefixes of the LMP can also be updated. At 408, the network packet can be routed based on the preferred route information associated with the LMP in the routing cache. At 402, another network packet can be received.

Alternatively, when a prefix matching the destination address is not found in the routing cache, the network packet can be forwarded to an intermediary, as illustrated at 410. At 412, the destination address can be compared to the prefixes in the full routing table to find an LMP corresponding to the destination address, and, at 414, the LMP can be copied from the full routing table to the routing cache. At 416, a set of additional prefixes can be copied from the full routing table to the routing cache. The set of additional prefixes can include sub-prefixes of the LMP, as previously discussed. At 402, another network packet can be received.

Figure 5:
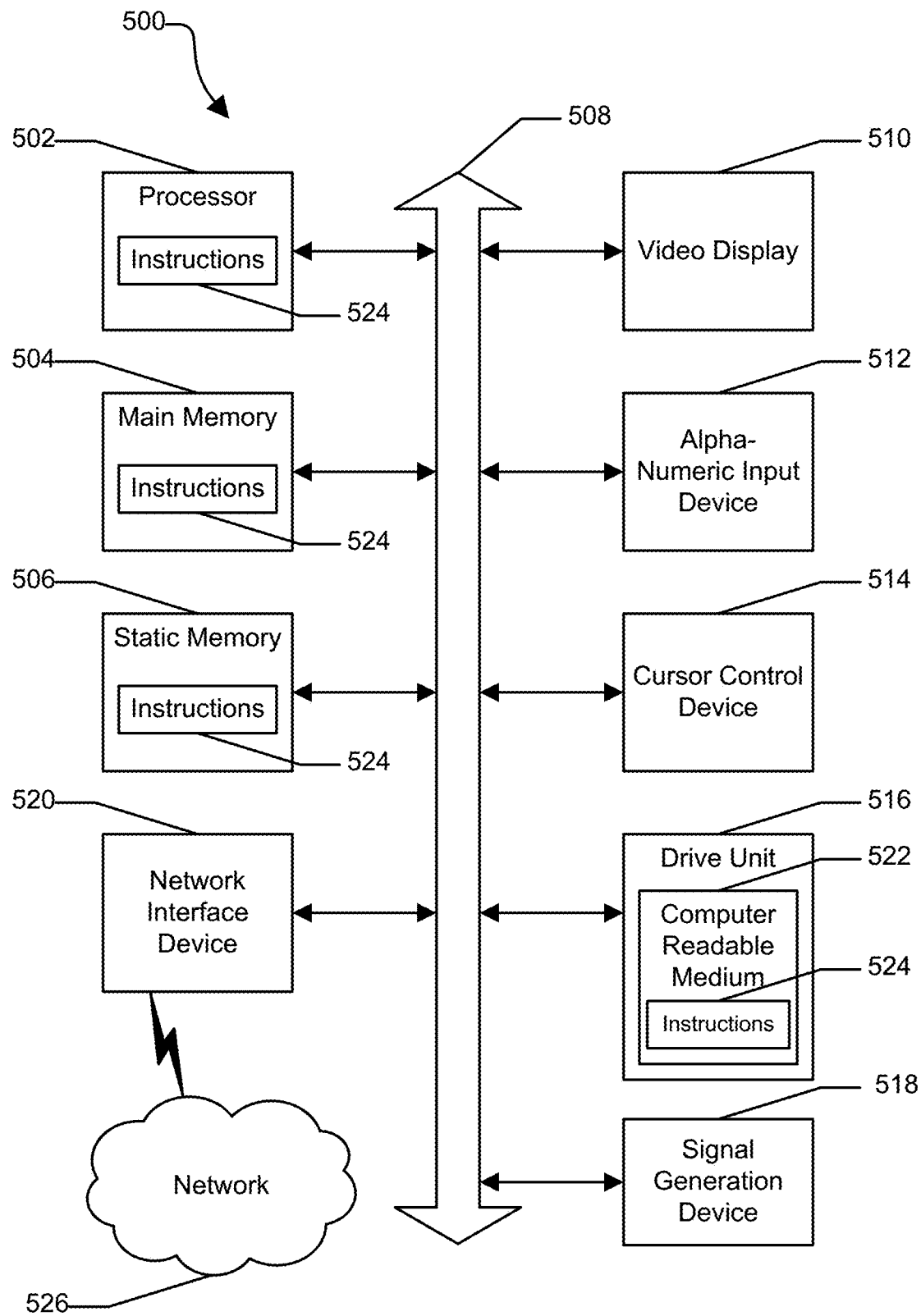
FIG. 5 is an illustrative embodiment of a general computer system.

FIG. 5 shows an illustrative embodiment of a general computer system 500. The computer system 500 can include a set of instructions that can be executed to cause the computer system to perform any one or more of the methods or computer based functions disclosed herein. The computer system 500 may operate as a standalone device or may be connected, such as by using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 500 can also be implemented as or incorporated into various devices, such as a personal computer (PC), a tablet PC, an STB, a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 500 can be implemented using electronic devices that provide voice, video or data communication. Further, while a single computer system 500 is illustrated, the term "system" shall also be taken to include any collection of systems or sub-systems that individually or jointly execute a set, or multiple sets, of instructions to perform one or more computer functions.

The computer system 500 may include a processor 502, such as a central processing unit (CPU), a graphics processing unit (GPU), or both. Moreover, the computer system 500 can include a main memory 504 and a static memory 506 that can communicate with each other via a bus 508. As shown, the computer system 500 may further include a video display unit 510 such as a liquid crystal display (LCD), an organic light emitting diode (OLED), a flat panel display, a solid-state display, or a cathode ray tube (CRT). Additionally, the computer system 500 may include an input device 512 such as a keyboard, and a cursor control device 514 such as a mouse. Alternatively, input device 512 and cursor control device 514 can be combined in a touchpad or touch sensitive screen. The computer system 500 can also include a disk drive unit 516, a signal generation device 518 such as a speaker or remote control, and a network interface device 520 to communicate with a network 526. In a particular embodiment, the disk drive unit 516 may include a computer-readable medium 522 in which one or more sets of instructions 524, such as software, can be embedded. Further, the instructions 524 may embody one or more of the methods or logic as described herein. In a particular embodiment, the instructions 524 may reside completely, or at least partially, within the main memory 504, the static memory 506, and/or within the processor 502 during execution by the computer system 500. The main memory 504 and the processor 502 also may include computer-readable media.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

The Abstract of the Disclosure is provided to comply with 37 C.F.R. § 1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A system, comprising:
   a memory that stores instructions;
   a processor that executes the instructions to perform operations, the operations comprising:
   merging a plurality of contiguous sub-prefixes of a longest matching prefix of a network packet into a super-prefix when the plurality of contiguous sub-prefixes have a same output port and different downstream routes;
   causing the plurality of contiguous sub-prefixes to be separated in a full routing table when the plurality of contiguous sub-prefixes have a same next hop and the different downstream routes;
   evicting a shortest sub-prefix of a subset of the plurality of contiguous sub-prefixes when multiple sub-prefixes of the subset match eviction criteria, when the shortest sub-prefix has been used a smallest number of times in comparison to other sub-prefixes of the subset, and when the shortest sub-prefix has a last used time that is older than the other sub-prefixes of the subset; and
   forwarding the network packet.

2. The system of claim 1, wherein the operations further comprise inserting the super-prefix into a routing cache.

3. The system of claim 1, wherein the operations further comprise copying, when the longest matching prefix is found in the full routing table and not found in a routing cache, the longest matching prefix to the routing cache.

4. The system of claim 1, wherein the operations further comprise receiving the network packet.

5. The system of claim 1, wherein the operations further comprise forwarding the network packet to an intermediary when the longest matching prefix is not found in a routing cache.

6. The system of claim 1, wherein the operations further comprise comparing a destination address of the network packet to a set of prefixes in the full routing table.

7. The system of claim 1, wherein the operations further comprise updating a routing cache when the longest matching prefix is found in the routing cache.

8. The system of claim 1, wherein the operations further comprise evicting, when a routing cache is full, a shortest prefix from the routing cache.

9. The system of claim 1, wherein the operations further comprise directing incoming traffic to an interface based on a preferred route associated with the longest matching prefix.

10. The system of claim 1, wherein the operations further comprise placing the network packet in a queue when the longest matching prefix is not found in a routing cache.

11. The system of claim 1, wherein the operations further comprise forwarding the network packet to a next hop.

12. The system of claim 1, wherein the operations further comprise copying, from the full routing table to a routing cache, a sub-prefix of the longest matching prefix, wherein the sub-prefix is a special-purpose prefix.

\* \* \* \* \*